United States Patent
Nagase et al.

(10) Patent No.: US 6,294,879 B1
(45) Date of Patent: Sep. 25, 2001

(54) BALLAST FOR A DISCHARGE LAMP

(75) Inventors: Haruo Nagase, Kitakatsuragi-gun; Noriyuki Satou, Nishikanbara-gun; Yoshitaka Taga, Osaka; Hisao Kataoka; Masatoshi Ueno, both of Nishikanbara-gun, all of (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/527,810

(22) Filed: Mar. 17, 2000

(30) Foreign Application Priority Data

Mar. 19, 1999 (JP) .................................................. 11-076437
Mar. 19, 1999 (JP) .................................................. 11-076439

(51) Int. Cl.$^7$ .................................................. H05B 37/02
(52) U.S. Cl. ..................... 315/209 R; 315/224; 315/291; 315/DIG. 5
(58) Field of Search ............................... 315/209 R, 291, 315/224, DIG. 5, DIG. 7

(56) References Cited

U.S. PATENT DOCUMENTS 6,107,754 * 8/2000 Kim ..................................... 315/219

FOREIGN PATENT DOCUMENTS 7-142182   6/1995 (JP) .

* cited by examiner

*Primary Examiner*—David Vu
(74) *Attorney, Agent, or Firm*—Oblon, Spivak, McClelland, Maier & Neustadt, P.C.

(57) ABSTRACT

A safety ballast for a discharge lamp capable of interrupting the supply of the electric power upon failure of starting the lamp. The ballast includes a converter providing a DC power voltage from a DC voltage source, a booster providing a boosted DC voltage to a starter which generates, based upon the boosted DC voltage, a starting voltage for starting the lamp, and an inverter receiving the DC power from the converter to provide an AC power for operating the lamp. The booster includes a capacitor which is charged by the DC power and accumulate the boosted voltage. A controller monitors a load condition of the lamp and issues a disable signal when a no-load condition continues over a predetermined starting period. The inverter includes a plurality of switching elements one of which is regulated to be turned on in response to the no-load signal for establishing a supply path of supplying the boosted voltage from the booster's capacitor through the switching element to the starter. The one switching element is also controlled to be turned off in response to the disable signal for interrupting the supply path. Thus, when the no-load condition continues over the predetermined starting period as indicative of the that the lamp has been removed or the lamp reaching its end of life, the booster's capacitor bearing the boosted voltage is disconnected from the starter, applying no voltage to the starter and therefore preventing the starter from being activated to generate unnecessary starting voltage.

13 Claims, 12 Drawing Sheets

BALLAST FOR A DISCHARGE LAMP

BACKGROUND OF THE INVENTION

1. Field of the Invention

The present invention is directed to a ballast for a discharge lamp, more particularly a high density discharge lamp such as a metal halide lamp and a mercury lamp.

2. Description of the Prior Art

As disclosed in Japanese Laid-Open Patent Publication No. 7-142182, a prior ballast for a discharge lamp is generally known to have a DC-to-DC converter supplying a DC voltage from a DC voltage source, a DC-to-AC inverter providing an AC voltage from the DC voltage source for operating the discharge lamp, a booster generating a boosted DC voltage, and a starter receiving the boosted voltage and providing a starting voltage of sufficiently high level for starting the lamp. The booster includes a capacitor which accumulates the boosted DC voltage to be supplied to the starter for developing the starting voltage. A problem remains in the ballast that, even if the ballast is deactivated as a consequence of that the discharge lamp fails to start due to absence of the lamp or the lamp reaching its end of operation life, the residual capacitance in the capacitor of the booster may cause the starter to develop the starting voltage or at least gives the boosted voltage to the starter, thereby giving unnecessary high voltage which may give undue stress to the components of the starter and create a possible electrical shock hazard to a personnel who accidentally touch the connection between the booster and the starter.

SUMMARY OF THE INVENTION

In view of the above problem, the present invention has been achieved to provide a safety ballast for a discharge lamp which is capable of disconnecting a supply of high voltage upon failure of starting the lamp, thereby avoiding undue occurrence of the high voltage and protecting a personnel from the electrical shock hazard. The ballast in accordance with the present invention includes a DC-to-DC converter providing a DC power voltage of a predetermined level from a DC voltage source, and a booster including a booster's capacitor which is charged through the DC-to-DC converter by the DC voltage source to accumulate a boosted voltage to be supplied to a starter so that the starter generates a starting voltage for starting the discharge lamp. Also included in the ballast is a DC-to-AC inverter which receives the DC power from the DC-to-DC converter to provide an AC power to operate the discharge lamp. The DC-to-AC inverter has a plurality of switching elements controlled to turn on and off for providing the AC power. Further, the ballast includes a controller which provides a no-load signal when the lamp is not started. The inverter is controlled by the controller to establish a supply path of supplying the boosted voltage from the booster's capacitor through the inverter to the starter. The one switching element is also controlled by the controller so as to be turned off in response to a condition where the discharge lamp fails to start within a predetermined time period, thereby interrupting the supply path. Thus, when the no-load condition continues over a predetermined starting period as indicative of the that the lamp has been removed or the lamp reaching its end of life, the booster's capacitor bearing the boosted voltage is disconnected from the starter, applying no voltage to the starter and therefore preventing the starter from being activated to generate unnecessary starting voltage. Further, since the boosted voltage is not applied to the connection between the starter and the booster, it is possible to protect personnel accidentally touching the connection from an electrical shock hazard which would be otherwise presented.

The controller may provides a disable signal when the no-load signal lasts over the predetermined starting period so as to turn off the one switching element, thereby interrupting the supply path. In this connection, the load detector may includes a timer which provides the disable signal when the discharge lamp fails to start within the predetermined time period as indicative of that the discharge lamp is disconnected.

In a preferred embodiment where the DC-to-DC converter, the booster, and the controller are integrated into a single driver module, the inverter has first and second output terminals through which the inverter is connected to the starter, and the booster has a third output terminal such that the booster is connected to the starter through the third and the second terminals. The booster's capacitor has its one end connected to the third terminal and has the other end connected to the second terminal through the switching element of the inverter so as to supply the boosted voltage to the starter. The switching element of the inverter is connected to the controller and is turned off in response to the disable signal, thereby interrupting a discharge loop starting from the booster's capacitor through the third and second output terminals.

Thus, the booster's capacitor responsible for supplying the boosted voltage is disconnected from the second and the third terminal by the switching element when the lamp is removed, thereby preventing an electrical shock hazard due to the boosted voltage, even if the user touches the connection between the third and second terminals.

Preferably, the booster's capacitor has its one end connected to the third output terminal and has the other end connected to the first terminal through another switching element of the inverter which is turned off in response to the disable signal. Thus, even if there is a short-circuit between the third and first output terminals, the booster's capacitor can be prevented from discharging the current through these terminals, therefore avoiding another possible electrical shock hazard.

It is preferred that the DC-to-AC inverter includes two pairs of switching transistors arranged in a full-bridge with each pair of the transistors disposed on opposed sides of the full-bridge. One pair of the transistors are controlled to turn on and off alternately with the other pair of the switching transistors to provide said AC power. The full-bridge has inputs connected to receive the DC power from the DC-to-DC converter and having outputs defining the first and second output ends, respectively. One of the switching transistors defines the switching element connected to the second terminal, while another transistor defines the switching element connected to the first terminal. Thus, the prevention of undue activation of the starter and the electrical shock hazard can be made by utilization of the switching transistors of the inverter responsible for providing the AC power to the lamp.

In a preferred embodiment, the DC-to-DC converter, the booster, the DC-to-AC inverter, and the load detector are accommodated in a single housing to form a driver module with the first, second and third output terminals for detachable connection with a lamp module integrating the discharge lamp and the starter. Thus, the ballast can be easily installed for detachable connection with the lamp module.

These and still other objects and advantageous features of the present invention will become more apparent from the following description of the preferred embodiments when taken in conjunction with the attached drawings.

DETAILED DESCRIPTION OF THE EMBODIMENTS

First Embodiment

Figure 1:
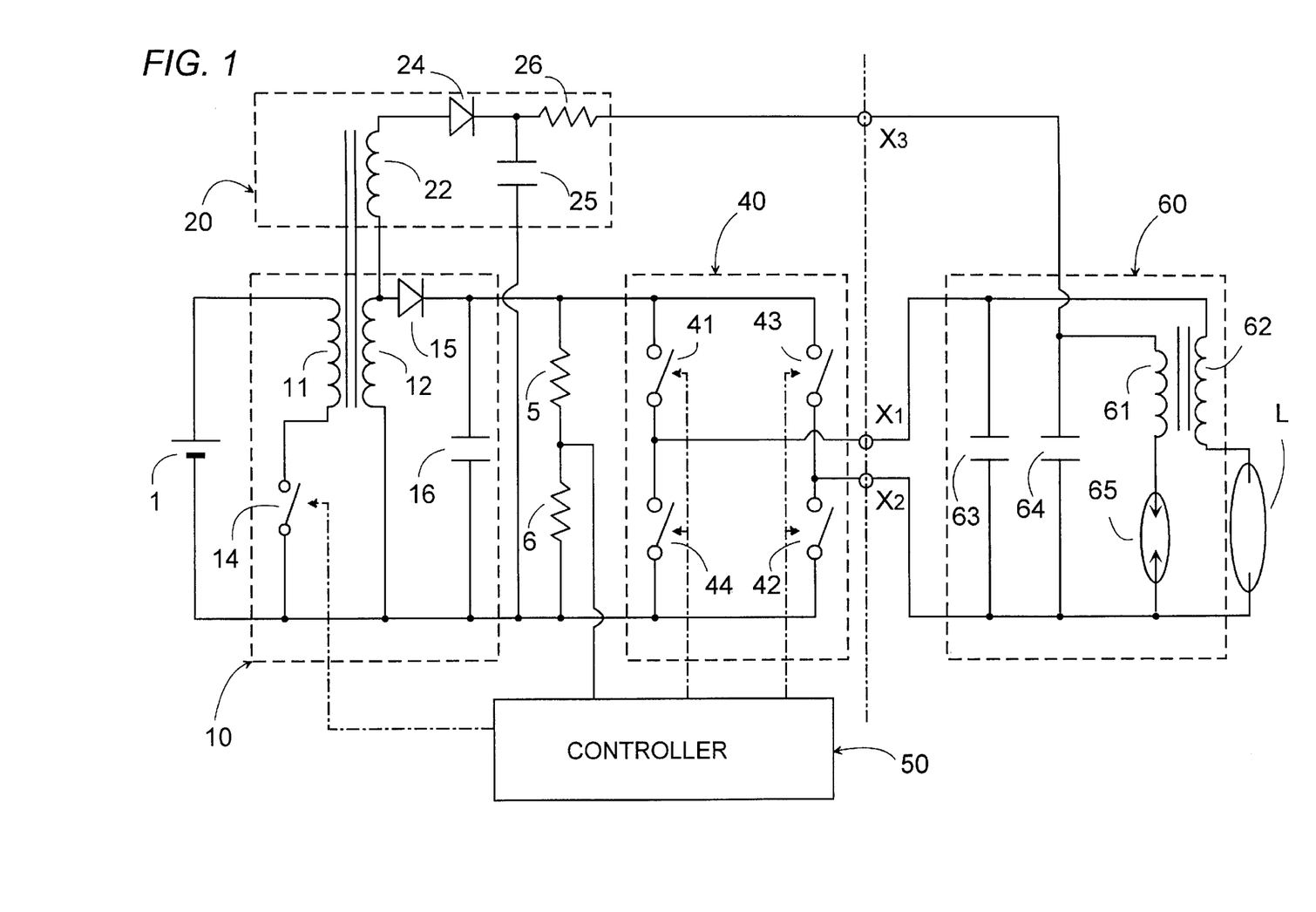
FIG. 1 is a circuit diagram of a ballast in accordance with a first embodiment of the present invention.

Referring now to FIG. 1, there is shown a ballast for a discharge lamp in accordance with a first embodiment of the present invention. The ballast is suitable for operating a high intensity discharge lamp for use as a headlamp of an automobile and a light source of LCD projector. The ballast comprises a DC-to-DC converter 10 adapted to be connected to a DC power source 1, such as a car battery or the like fixed voltage source, for providing a DC power, a booster 20 connected to the DC voltage source 1 through the converter 10 to generate a boosted voltage, and an inverter 40 receiving the DC power from the converter 10 and proving an AC power for operating the discharge lamp L. The booster 20 is connected to provide the boosted DC voltage to a starter 60 which responds to generate a starting voltage of sufficiently high level for starting the lamp L. Also included in the ballast is a power controller 50 which is responsible for controlling the converter 10 and the inverter 40 to start and operate the lamp based upon a monitored condition of the discharge lamp. The converter 10, the booster 20, the inverter 40, and the power controller 50 are accommodated in a single housing to form a driver module, while the lamp L is accommodated together with the starter 60 to form a lamp module detachable to the driver module.

The converter 10 includes a transformer with a primary winding 11 and a secondary winding 12. The primary winding 11 is connected in series with a switching transistor 14 across the DC power source 1. The switching transistor 14 is controlled by the power controller 50 to repetitively turn on and off at a frequency of about several tens to several hundreds kHz, inducing a voltage across the secondary winding 12. The induced voltage is fed through a diode 15 to charge a capacitor 16 which outputs the resulting DC voltage to the inverter 40.

The booster 20 includes a winding 22 which is magnetically coupled to the primary winding 11 of the converter 10 to induce a corresponding voltage across the winding 22. The winding 22 is formed integrally with the secondary winding 12 and is functionally separated therefrom by a center tap. The voltage is fed through a diode 24 to charge a capacitor 25 which provides the boosted voltage to the starter 60 through a resistor 26.

The inverter 40 includes two pairs of switching transistors 41, 42, and 43, 44 which are arranged in a full-bridge configuration and are controlled by the power controller 50 so that each pair of the transistors 41, 42 and 43, 44 on opposed sides of the full-bridge turn on and off simultaneously. Normally, the pair of the transistors 41 and 42 are controlled to turn on and off alternately with the other pair of the transistors 43 and 44 at a frequency of several hundreds kHz, thereby providing the AC power for operating the lamp L. The inverter 40 has its output ends terminating at first and second output terminals X1 and X2 through which the inverter 40 is detachably connected to the starter 60 including the lamp L.

The capacitor 25 of the booster 20 has its one end connected through resistor 26 to a third output terminal X3 and has the other end connected to the second output terminal X2 through the switching transistor 42, and to the first output terminal X1 through the switching transistor 44. It is through the second and third output terminals X2 and X3 that the booster 20 is detachably connected to starter 60 for providing the boosted voltage to the starter.

The starter 60 comprises a capacitor 63 connected across the first and second terminals X1 and X2, a capacitor 64 connected across the second and third output terminals X2 and X3, and a transformer with a primary winding 61 and a secondary winding 62. The primary winding 61 is connected in series with a spark gap element 65 across capacitor 64, while the secondary winding 62 is connected in series with the discharge lamp L across capacitor 63. Capacitor 64 is connected to receive the boosted voltage from capacitor 25 of the booster 20 through the switching transistor 42 of the inverter 40 so as to be charged by capacitor 25. When capacitor 64 is charged up to a discharge starting voltage of the spark gap element 65, the element 65 becomes conductive to induce across the secondary winding 62 the starting voltage which is applied to start the discharge lamp L.

A voltage divider of resistors 5 and 6 is connected across capacitor 16 to provide to the power controller 50 a divided voltage indicative of a lamp voltage being applied to the lamp. Based upon the lamp voltage, the power controller 50 gives the functions of:

1) activating the booster 20 to cause the starter 60 to generate the starting voltage for starting the lamp and subsequently activating the inverter 40 to apply the AC power for operating the lamp; and 2) detecting a no-load condition as indicative of the lamp having not being operated or extinguished when the lamp voltage does not decrease to a predetermined level, and subsequently starting the lamp; and 3) detecting a failure of starting the lamp as indicative of the lamp being disconnected or the lamp reaching its end of operation life when within a predetermined starting time period, i.e., when the no-load signal lasts over the predetermined period. For this purpose, the power controller 50 includes a timer that counts a predetermined starting period for determination of the failure of starting the lamp.

Figure 2:
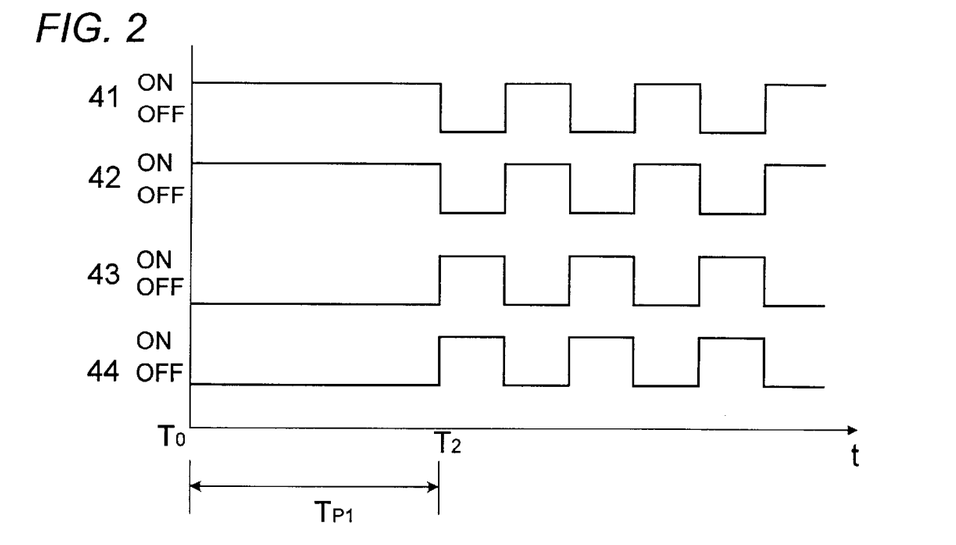
FIGS. 2 to 4 are waveform charts illustrating the operation of the ballast, respectively.
Figure 3:
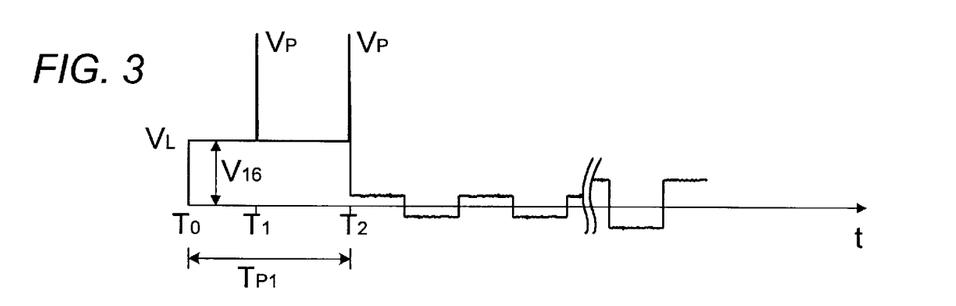
Figure 4:
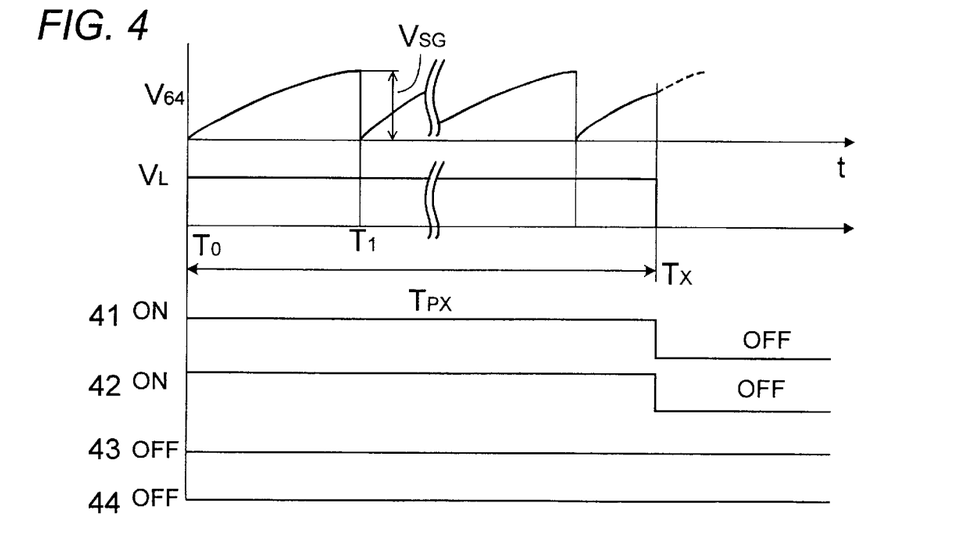

Operation of the ballast will be now discussed with reference to FIGS. 2 to 4. Upon energization of the ballast at time T0, the inverter 40 is controlled to turn on the transistors 41 and 42 while keeping the other two transistors 43 and 44 turned off, as shown in FIG. 2. During this starting time period, the DC output voltage V16 of capacitor 16 of the converter 10 is applied through terminals X1 and X2 to the lamp L, and at the same time, the DC voltage from capacitor 25 of the booster 20 is applied through the terminals X2 and X3 to charge capacitor 64 of the starter 60. As soon as capacitor 64 is charged up to the discharge starting voltage of the spark gap element 65, the element 65 becomes conductive so that a pulse voltage $V_p$ is generated across the secondary winding 62 and is additive to the voltage V16 to give the starting voltage. The starting voltage is applied to the lamp at time T1 and T2, attempting to start the lamp. When the lamp is started successfully, the lamp voltage VL is lowered so that the power controller 50 can acknowledge the starting of the lamp. In this instance, the lamp is detected to start at time T2 in FIGS. 2 and 3. Subsequently, the power controller 50 responds to turn on and off the transistors 43 and 44 alternately with transistors 41 and 42 so that the inverter 40 provides the AC power for continuing to operate the lamp.

Even if the lamp is disconnected, i.e., the lamp module is disconnected from the driver module at terminals X1, X2, and X3, the power controller 50 still activates the starter 60 to generate the starting voltage, attempting to start the absent lamp. That is, as shown in FIG. 4, voltage V64 across the capacitor 64 repeats to increase up to the discharge starting voltage or the spark gap voltage VSG and drop to zero, failing to start the lamp. Thus, the lamp voltage VL is kept high, which is acknowledged by the controller 50. If the lamp voltage is not lowered to such a level indicative of the lamp being started within the starting period TPX defined by the timer, the controller 50 determines that the lamp module is disconnected or the lamp reaches its end of operation life, and issues a disable signal at the end Tx of the starting time period TPX. The starting time period TPX is selected to be longer than a given period TP1 within which the power controller 50 gives two or more chances of generating the starting voltage for starting the lamp. In response to the disable signal, the power controller 50 causes the transistors 41 and 42 to turn off, while keeping the transistors 43 and 44 turned on, thereby interrupting a closed loop of supplying the voltage from capacitor 25 to capacitor 64 through the terminals X3 and X2 and through the transistor 42. Therefore, no current is fed to the starter to prevent the starter from generating the unnecessary starting voltage which would give undue stress to the components of the starter. This is also advantageous in protecting the personnel from a possible electrical hazard when the personnel touches the components of the starter 60 with the lamp itself disconnected and with the starter being kept connected to the ballast. Further, even if personnel should accidentally touch the terminals X3 and X2 simultaneously, no current path is formed through the personnel from capacitor 25 bearing the increased voltage, protecting the personnel from electrical shock hazard which would otherwise occur.

It is noted in this connection that the converter 10 may be deenergized in response to the disable signal. In such case, there still remains a danger of causing the above-mentioned electrical shock hazard due to the residual electrical charge in capacitor 25. Therefore, the interruption of the discharge path from capacitor 25 is essential in preventing the above undue generation of the starting voltage as well as the shock hazard.

Figure 5:
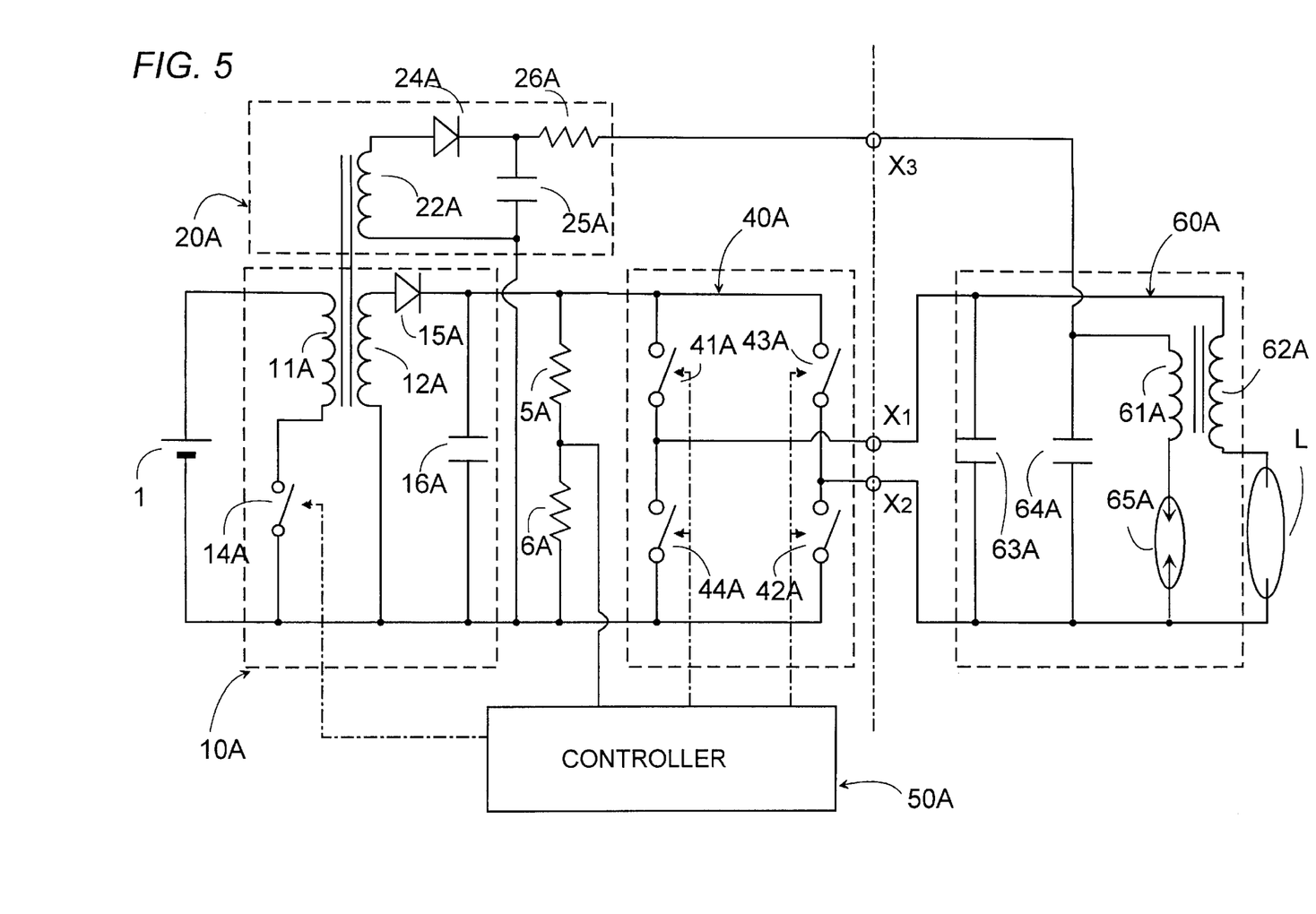
FIGS. 5 to 7 are circuit diagrams of a ballast in accordance with modifications of the fist embodiment, respectively.

FIG. 5 shows a modification of the first embodiment which is identical to the first embodiment except that a winding 22A of the booster 20A is separately formed from the second winding 12A of the converter 10A. Like parts are designated by like numerals with a suffix letter of "A".

Figure 6:
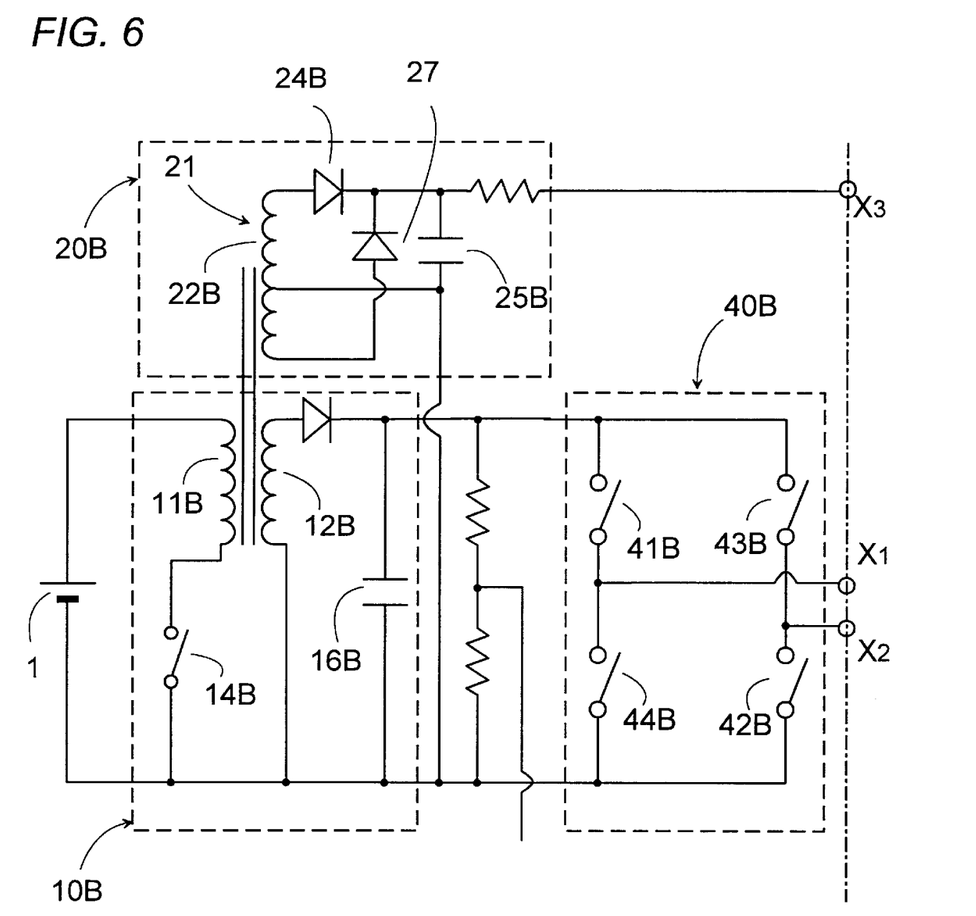

FIG. 6 shows another modification of the first embodiment which is identical to the first embodiment except that the booster 20B provides a voltage doubler 21 for developing the increased voltage across capacitor 25B. Like parts are designated by like reference numerals with a suffix letter of "B". The voltage doubler 21 comprises the winding 22B, a diode 27 connected across the winding 22B, and diode 24B connected between the capacitor 25B and the winding 22B. The winding 22B has a center tap which is connected in circuit such that capacitor 25B is connected across each half segment of the winding through each of diodes 24B and 27, thereby accumulating the increased DC voltage across capacitor 25B.

Figure 7:
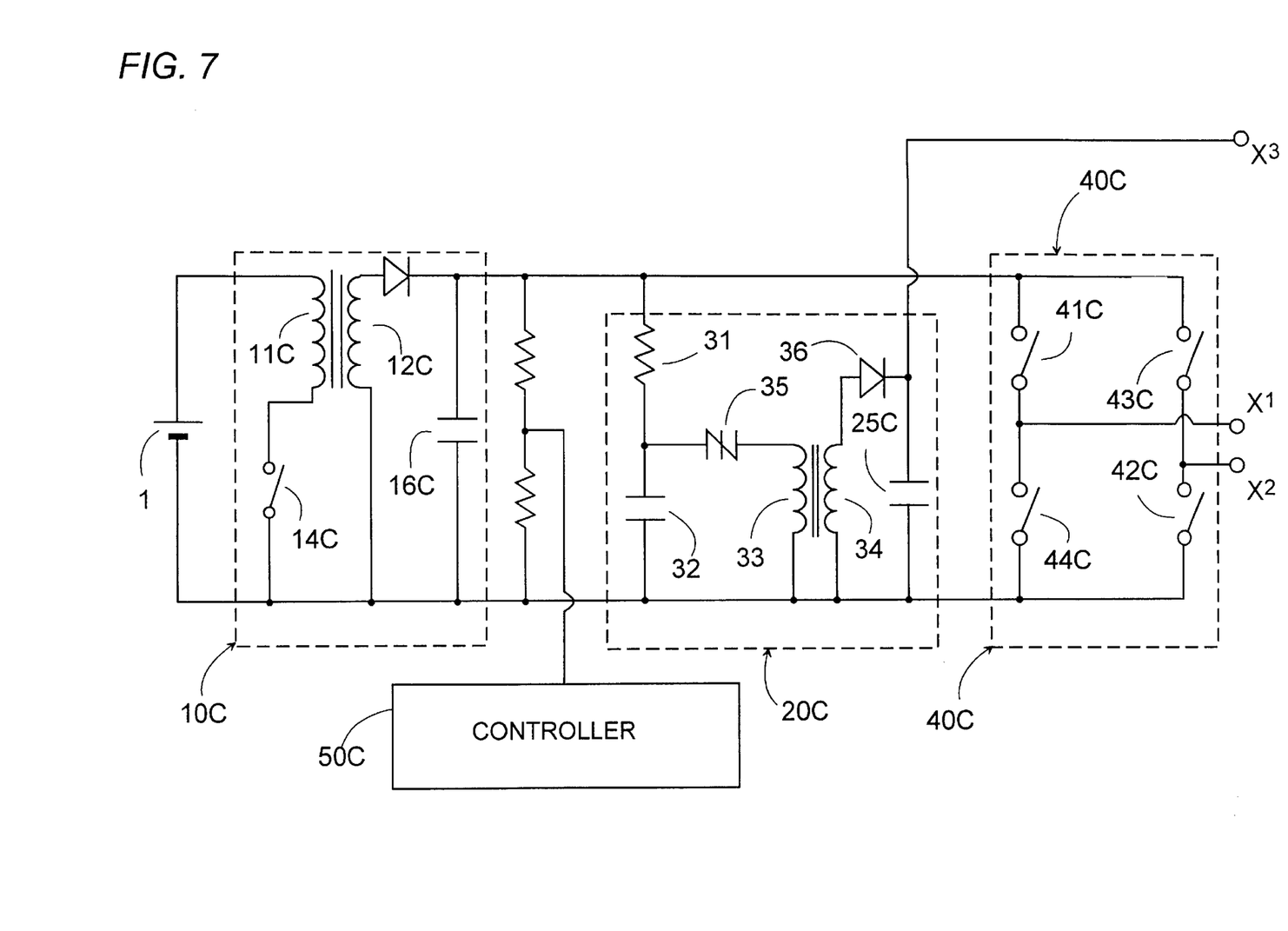

FIG. 7 shows a further modification of the first embodiment which is identical to the first embodiment except for the configuration of a booster 20C. Like parts are designated by like numerals with a suffix letter of "C". The booster 20C is connected to receive the DC voltage from capacitor 16C of the converter, and comprises a series combination of a resistor 31 and a capacitor 32 connected across capacitor 16C, and a transformer with a primary winding 33 and a secondary winding 34. The primary winding 33 is connected in series with a bi-directional thyristor 35 across capacitor 32, while the secondary winding 34 is connected in series with a diode 36 across the capacitor 25C. As the capacitor 32 is charged up to a break-over voltage of thyristor 33, thyristor 33 becomes conductive to initiate an oscillation in a closed circuit of capacitor 32, thyristor 33, and primary winding 33, thereby inducing across the secondary winding 34 a voltage which is rectified by diode 36 to accumulate the resulting DC voltage in capacitor 25C connected between terminals X2 and X3. Thus, capacitor 25C provides the boosted DC voltage to the starter (not shown) through terminals X2 and X3. The break-over voltage of thyristor 33 is determined to be higher than the output voltage from the converter 10C when the inverter is active to operate the lamp such that thyristor 33 becomes conductive only during the starting period in which transistors 41C and 42C are turned on with the other transistors 43C and 44C being kept turned off. Therefore, once the lamp is started, thyristor 33 no longer becomes conductive to thereby lower the voltage of capacitor 25C, making the starter inactive and therefore eliminating a possibility of generating unnecessary starting voltage thereat.

Second Embodiment

Figure 8:
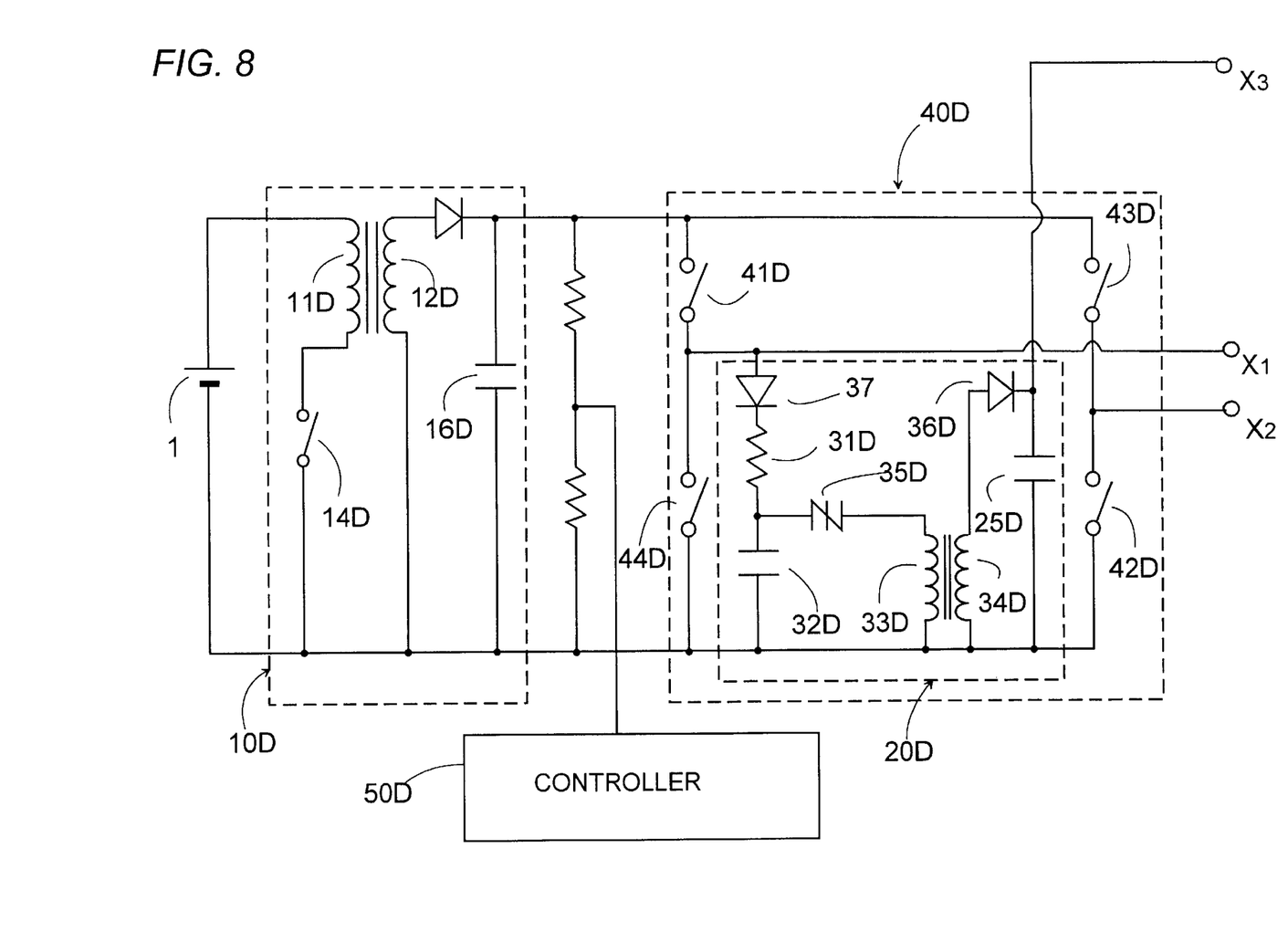
FIG. 8 is a circuit diagram of a ballast in accordance with a second embodiment of the present invention.

FIG. 8 shows a ballast in accordance with a second embodiment of the present invention which is identical to the first embodiment except that a booster 20D is integrated in the inverter 40D. Like parts are designated by like numerals with a suffix letter of "D". The booster 20D includes a series combination of a diode 37, a resistor 31D, and a capacitor 32D connected across transistor 44D, and a transformer with a primary winding 33D and a secondary winding 34D. The primary winding 33D is connected in series with a bi-directional thyristor 35D across capacitor 32D, while the secondary winding 34D is connected in series with a diode 36D across the capacitor 25D. While the transistor 41D is on, capacitor 32D is charged through diode 37 and resistor 31D by the DC voltage from capacitor 16D of the converter 10D. As the capacitor 32D is charged up to a break-over voltage of thyristor 33D, thyristor 33D becomes conductive to initiate an oscillation in a closed circuit of capacitor 32D, thyristor 33D, and primary winding 33D, thereby inducing across the secondary winding 34D a voltage which is rectified by diode 36D to accumulate the resulting voltage in capacitor 25D connected between terminals X2 and X3. Thus, capacitor 25D provides the boosted DC voltage to the starter (not shown) through terminals X2 and X3 during the starting period given by the power controller 50 where the transistors 41D and 42D are turned on with the other transistors 43D and 44D being kept turned off.

Since the capacitor 32D is charged sufficiently to initiate the oscillation and give the increased DC voltage to capacitor 25D only during the starting period in which the transistor 41D is kept turned on for a long while, capacitor 32D is not charged sufficiently after the inverter 40D begins operating the lamp by turning on and off the transistors 41D and 42D alternately with transistors 43D and 44D. Thus, the booster 20D can be inactivated once the lamp is started, and such inactivation of the booster can be made without requiring any additional circuit component.

It is noted in this connection that thyristor 33D may be selected to have a break-over voltage higher than the output voltage from the converter 10C when the inverter 40D is active to operate the lamp, as made in the circuit of FIG. 7.

Also, in this embodiment, in response to the disable signal from the power controller, transistors 41D and 42D are turned off with transistors 43D and 44D being kept turned off, whereby interrupting a discharge path of capacitor 25D between terminals X3 and X2, as well as another discharge path of capacitor 25D between terminals X3 and X1.

Figure 9:
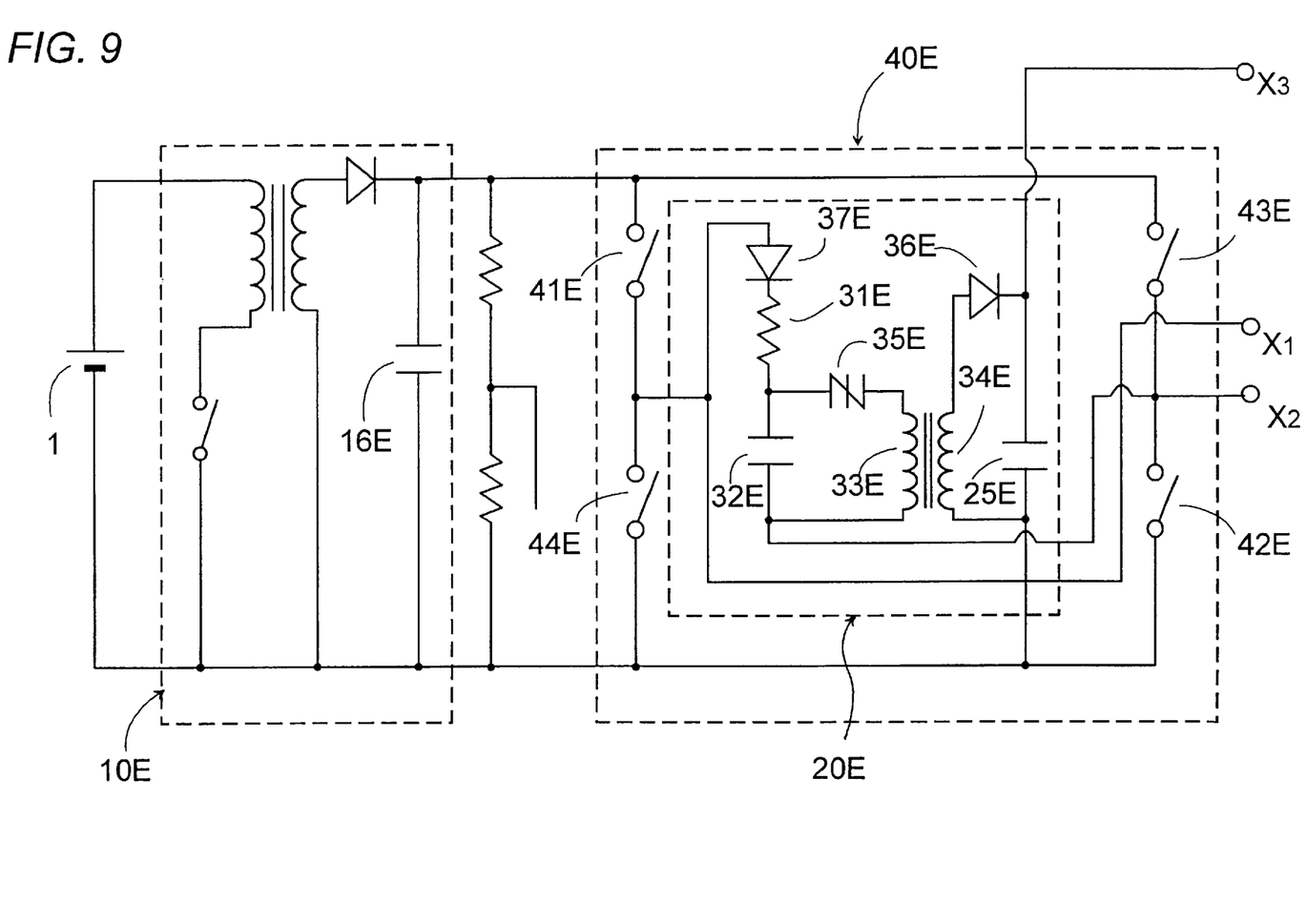
FIG. 9 is a circuit diagram of a ballast in accordance with a modification of the second embodiment.

FIG. 9 shows a modification of the second embodiment which is identical to the second embodiment except for connections of the booster 20E with the inverter 40E. Like parts are designated by like reference numerals with a suffix letter of "E". The booster 20E includes a series combination of a diode 37E, a resistor 31E, and a capacitor 32E connected across a series combination of transistors 44E and 42E, and a transformer with a primary winding 33E and a secondary winding 34E. The primary winding 33E is connected in series with a bi-directional thyristor 35E across capacitor 32E, while the secondary winding 34E is connected in series with a diode 36E across the capacitor 25E. While the transistors 41D and 42E are on, capacitor 32E is charged through diode 37E and resistor 31E by the DC voltage from capacitor 16E of the converter 10E. As capacitor 32E is charged up to a break-over voltage of thyristor 33E, thyristor 33E becomes conductive to initiate an oscillation in a closed circuit of capacitor 32E, thyristor 33E, and primary winding 33E, thereby inducing across the secondary winding 34E a voltage which is rectified by diode 36E to accumulate the resulting voltage in capacitor 25E connected between terminals X2 and X3. Thus, capacitor 25E provides the boosted DC voltage to the starter (not shown) through terminals X2 and X3 during the starting period given by the power controller where the transistors 41E and 42E are turned on with the other transistors 43E and 44E being kept turned off.

Third Embodiment

Figure 10:
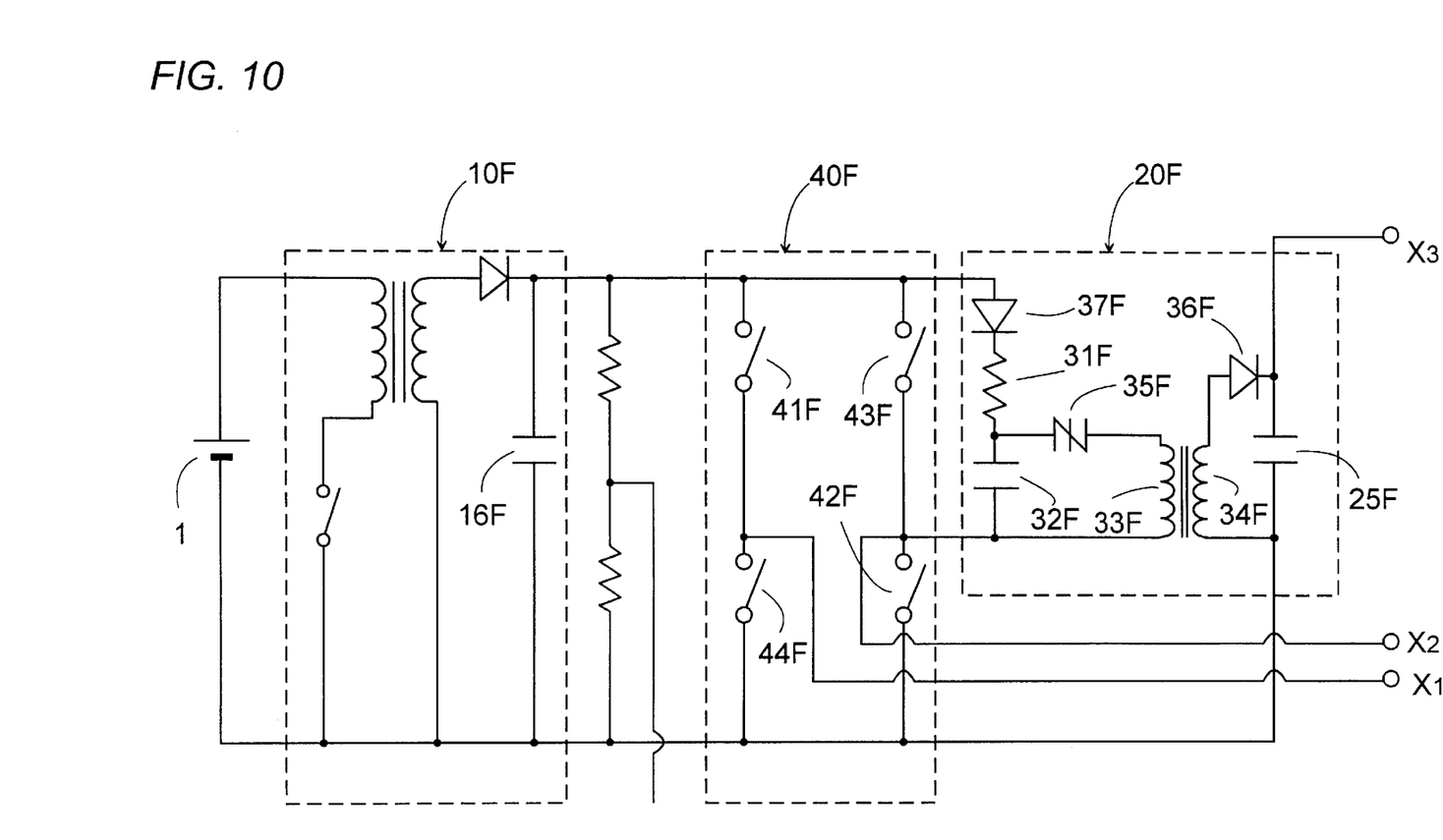
FIG. 10 is a circuit diagram of a ballast in accordance with a third embodiment of the present invention.

FIG. 10 shows a ballast in accordance with a third embodiment which is identical to the second embodiment except that a booster 20F is connected differently with the inverter 40F. Like parts are designated by like numerals with a suffix letter of "F". The booster 20F comprises a series combination of a diode 37F, a resistor 31F, and a capacitor 32F connected across a transistors 43F, and a transformer with a primary winding 33F and a secondary winding 34F. The primary winding 33F is connected in series with a bi-directional thyristor 35F across capacitor 32F, while the secondary winding 34F is connected in series with a diode 36F across the capacitor 25F. While the transistor 42F are on, capacitor 32F is charged through diode 37F and resistor 31F by the DC voltage from capacitor 16F of the converter 10F. As capacitor 32F is charged up to a break-over voltage of thyristor 33F, thyristor 33F becomes conductive to initiate an oscillation in a closed circuit of capacitor 32F, thyristor 33F, and primary winding 33F, thereby inducing across the secondary winding 34F a voltage which is rectified by diode 36F to accumulate the resulting voltage in capacitor 25F connected between terminals X2 and X3. Thus, capacitor 25F provides the boosted DC voltage to the starter (not shown) through terminals X2 and X3 during the starting period given by the power controller where the transistors 41F and 42F are turned on with the other transistors 43F and 44F being kept turned off. Upon occurrence of the disable signal, transistors 41F and 42F are turned off with transistors 43F and 44F being kept turned off, whereby interrupting a discharge path of capacitor 25F between terminals X3 and X2, as well as another discharge path of capacitor 25F between terminals X3 and X1.

Figure 11:
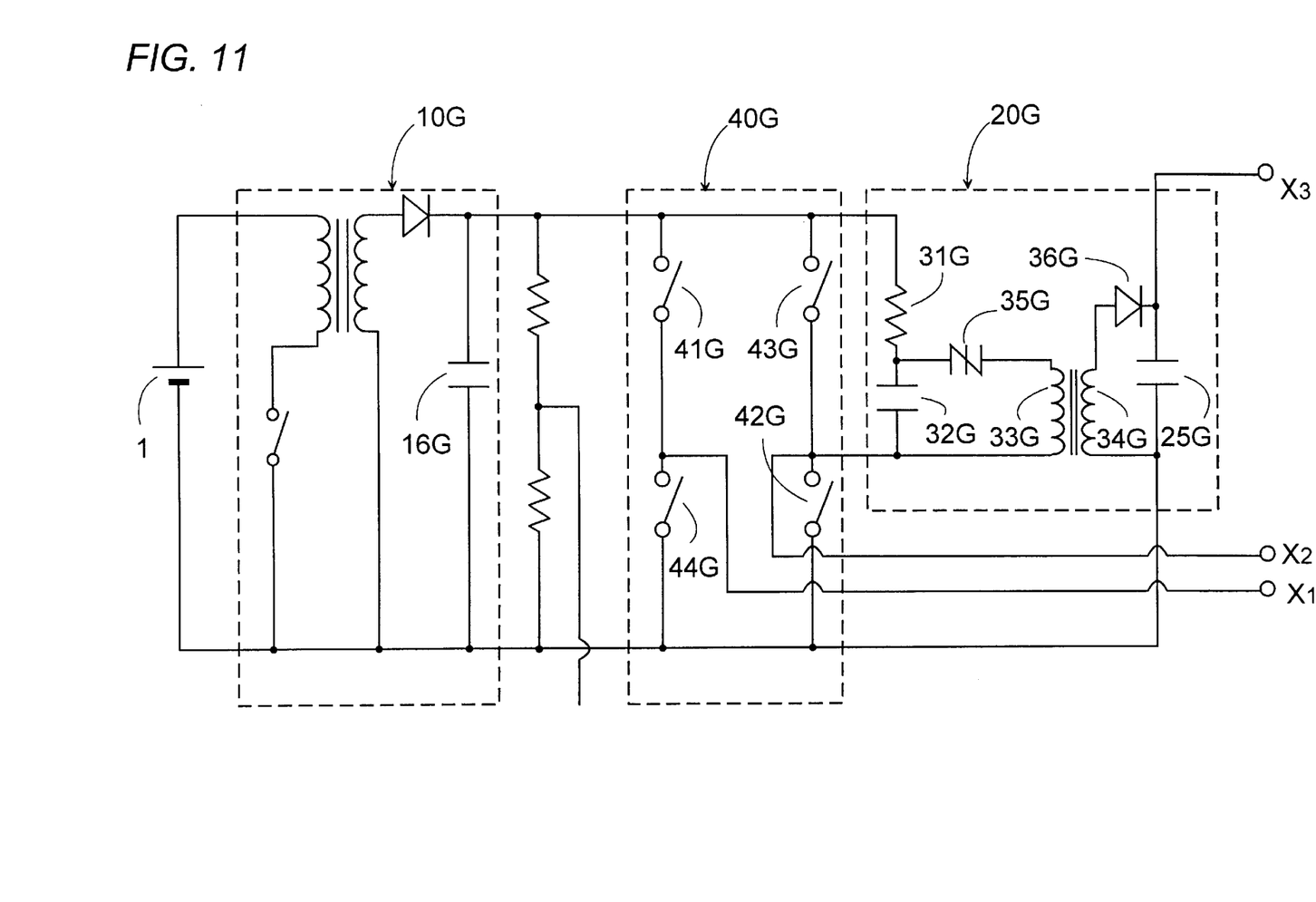
FIG. 11 is a circuit diagram of a ballast in accordance with a modification of the third embodiment.

FIG. 11 shows a modification of the third embodiment which is identical to the third embodiment except for removal of diode 37F from the circuit of FIG. 10. Like parts are designated by like reference numerals with a suffix letter of "G". Due to the removal of diode, once the lamp is started and operated by turning on and off transistors 41G and 42G alternately with transistors 43G and 44G, capacitor 32G repeats being charged and discharged so as not to reach the break-over voltage of thyristor 35G, thereby prohibiting capacitor 25G from accumulating the boosted voltage. Thus, the booster 20G is substantially inactivated after the lamp is started.

Fourth Embodiment

Figure 12:
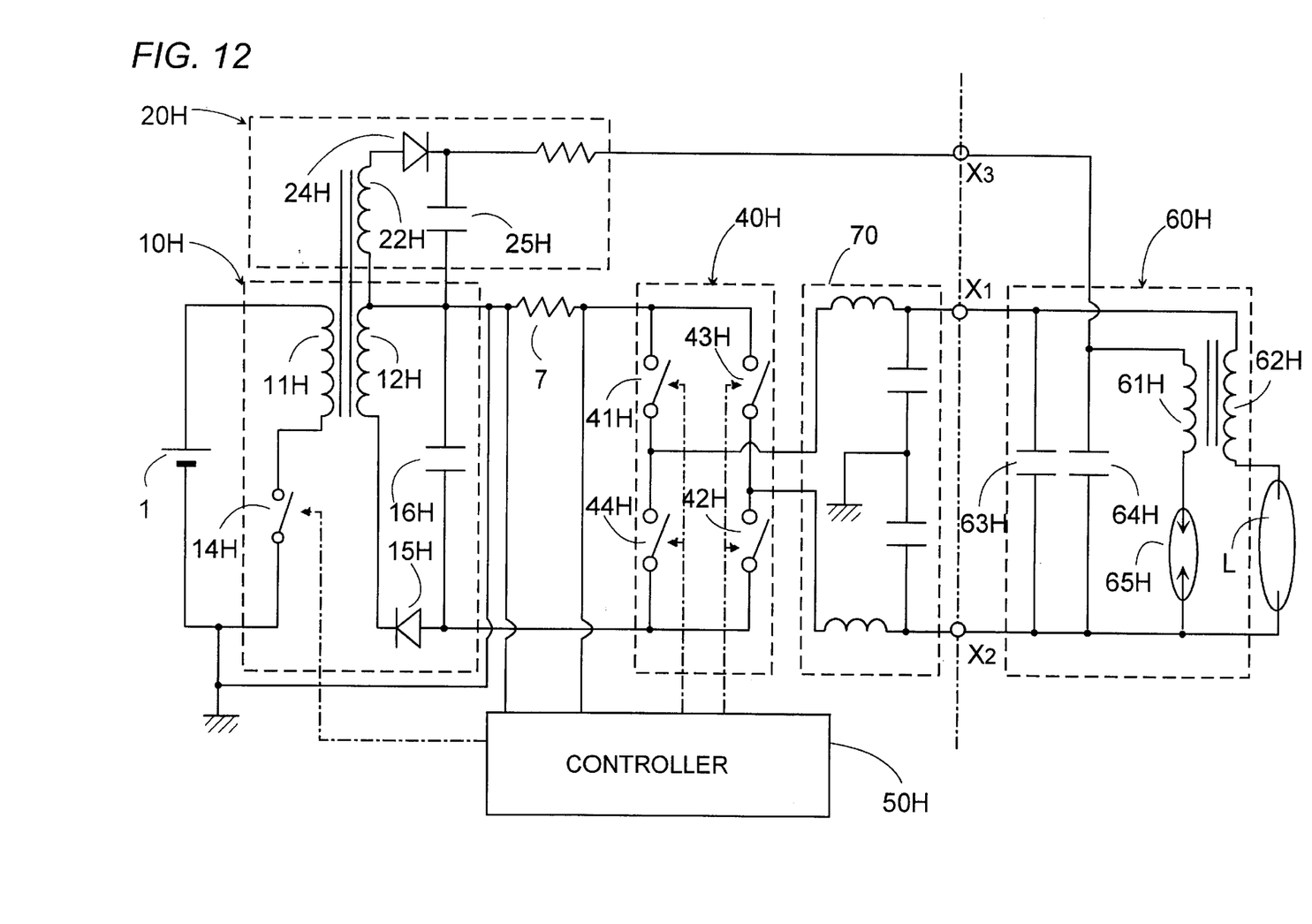
FIG. 12 is a circuit diagram of a ballast in accordance with a fourth embodiment of the present invention.

FIG. 12 shows a ballast in accordance with a fourth embodiment of the present invention which is basically identical to the first embodiment except that capacitor 25H of the booster 20H is connected in series with capacitor 16H of the converter 10H between terminals X3 and X2 through transistor 42H and also between terminals X3 and X1 through transistor 44H. The converter 10H includes a transformer with a primary winding 11H and a secondary winding 12H which is electrically isolated from the primary winding but is magnetically coupled thereto. The primary winding 11H is connected in series with a switch 14H across the DC source 1, while the capacitor 16H is connected in series with a diode 15H across the secondary winding 12H. The switch 14H is controlled by the power controller 50H to repetitively turn on and off for inducing across the secondary winding a corresponding voltage which is rectified by diode 15H to charge capacitor 16H. The booster 10H includes an auxiliary winding 22H which is magnetically coupled to the primary winding 11H to induce thereacross a voltage which is rectified by diode 24H to charge capacitor 25H. Thus, the capacitor 25H is additive to capacitor 16H to provide the boosted voltage to the starter 60H for charging capacitor 64H. This means that capacitor 25H can be selected to be smaller to accumulate less voltage than the like capacitor utilized in the previous embodiments.

The connection between capacitors 25H and 16H are grounded so that only a portion of the boosted voltage, i.e., voltage only from capacitor 25H may be responsible for flowing a short-circuit current if a grounded personnel should touch a single terminal X3. Thus, an electrical shock hazard in this condition can be weakened as compared to the case where capacitor 16H would be grounded at the opposite end to flow a corresponding short-circuit current from the combination of capacitors 25H and 16H.

In this embodiment, a current sensing resistor 7 is provided between the converter 10H and the inverter 40H instead of the voltage divider as utilized in the previous embodiments. The resistor 7 is connected to give the lamp current to a power controller 50H such that the power controller 50H can responds to start and operate the lamp based upon the level of the monitored lamp current, and that the controller 50H can determine the failure of starting the lamp and issue the disable signal indicative of that the lamp is disconnected or damaged. A filter 70 is provided between the inverter 40H and the terminals X1 and X2.

Fifth Embodiment

Figure 13:
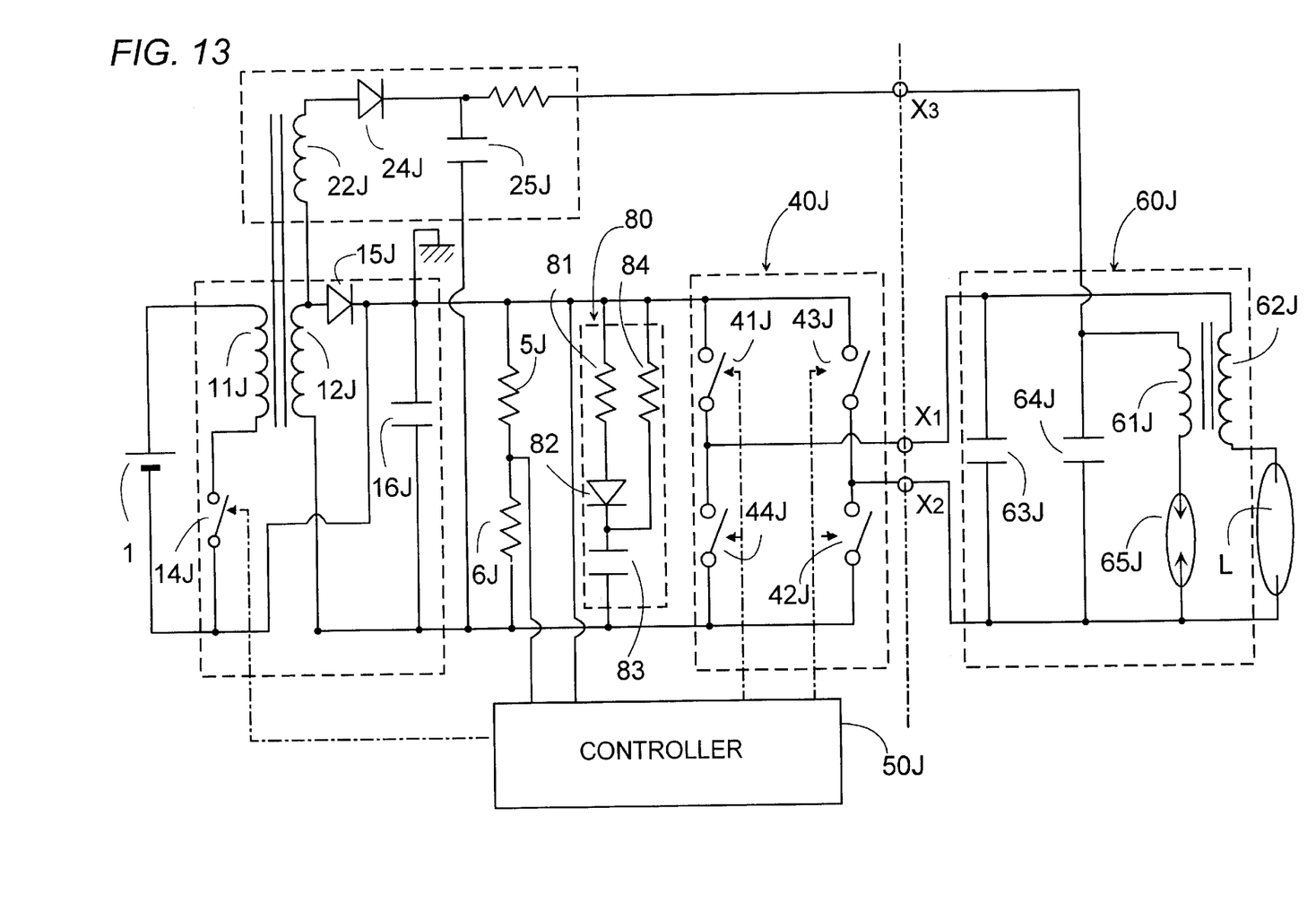
FIG. 13 is a circuit diagram of a ballast in accordance with a fifth embodiment of the present invention.

FIG. 13 shows a ballast in accordance with a fifth embodiment of the present invention which is identical to the first embodiment except that a capacitor 16J of the converter 10J is grounded at its positive side. Like parts are designated by like numerals with a suffix letter of "J". The converter 10J includes a transformer with a primary winding 11J and a secondary winding 12J which is electrically isolated from the primary winding but is magnetically coupled thereto. The primary winding 11J is connected in series with a switch 14J across the DC source 1, while the capacitor 16J is connected in series with a diode 15J across the secondary winding 12J. The switch 14J is controlled by the power controller 50J to repetitively turn on and off for inducing across the secondary winding a corresponding voltage which is rectified by diode 15J to charge capacitor 16J. The booster 10J includes an auxiliary winding 22J which is magnetically coupled to the primary winding 11J to induce thereacross a voltage which is rectified by diode 24J to charge capacitor 25J. The connection between diode 15J and capacitor 16J is grounded such that capacitor 25J may be connected in anti-series with capacitor 16J. Thus, if a grounded personnel should touch terminal X3, only capacitance from capacitor 26J minus capacitor 16J would responsible for flowing a current through the personnel, reducing the corresponding electrical shock hazard.

The ballast of the present embodiment further includes an auxiliary starter 80 between the converter 10J and the inverter 40J. The auxiliary starter 80 includes a series combination of a resistor 81, a diode 82, and a capacitor 83 connected across capacitor 16J, and a resistor connected across the series combination of resistor 81 and diode 82. Thus configured auxiliary starter 80 functions to release capacitance from capacitor 83 to the lamp upon discharge of the lamp, thereby facilitating to start the lamp.

Although in the above embodiments and modifications, switching transistors 41 and 42 are kept turned on while transistors 43 and 44 are kept turned off during the starting period, it is possible that the transistors 41 and 42 are turned on and off alternately with transistors 43 and 44 provided that transistor 42 is turned off in response to the disable signal, i.e., a detection of the lamp failing to start during the period.

Figure 14:
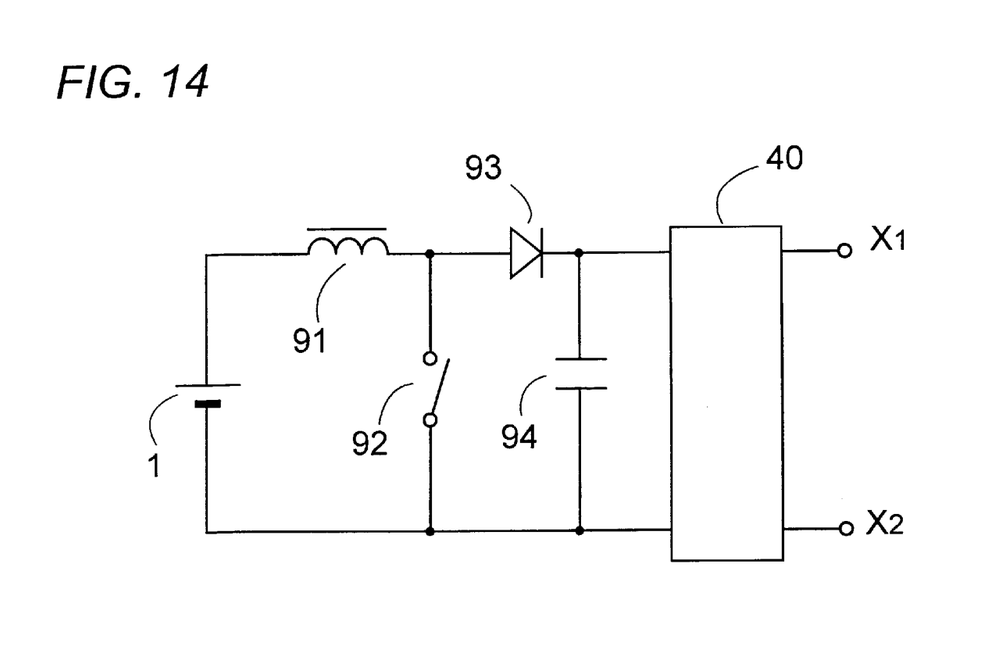
FIGS. 14 and 15 are circuit diagrams respectively illustrating modifications of DC-to-DC converter which may be utilized in the ballast of the present invention.
Figure 15:
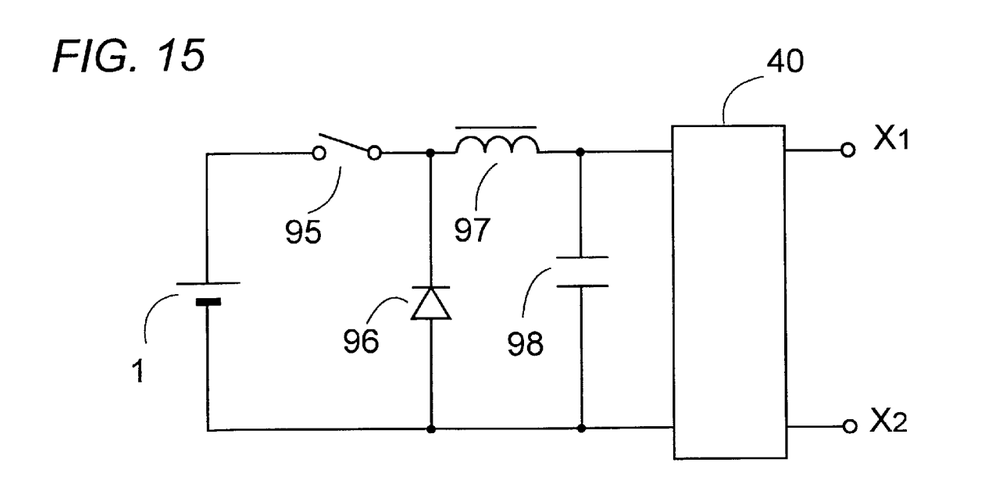

Further, although the DC-to-DC converter of fly-back type is utilized in the above embodiments and modification, other types of DC-to-DC converter may be equally utilized as shown in FIGS. 14 and 15. The converter of FIG. 14 includes a series combination of an inductor 91 and a switching transistor 92 connected across the DC source 1, and a capacitor 94 connected in series with a diode 93 across the transistor 92. Capacitor 94 provides an output voltage to the inverter 40. The converter of FIG. 15 includes a series combination of a switching transistor 95 and a diode connected across the DC source 1, and a capacitor 98 connected in series with an inductor 97 across diode 96. Capacitor 98 provides an output voltage to the inverter 40.

What is claimed is:

1. A ballast for a discharge lamp comprising:
   a DC-to-DC converter providing a DC power of a predetermined level from a DC voltage source;
   a booster including a booster's capacitor which is charged through said DC-to-DC converter by said DC voltage source to accumulate a boosted voltage to be supplied to a starter so that said starter generates a starting voltage for starting the lamp;
   a DC-to-AC inverter receiving said DC power from said DC-to-DC converter to provide an AC power for operating said discharge lamp, said DC-to-AC inverter having a plurality of switching elements controlled to turn on and off for providing said AC power;
   a controller which provides a no-load signal when said discharge lamp is not started;
   said DC-to-AC inverter being controlled by said controller to establish a supply path of supplying said boosted voltage from said booster's capacitor through said DC-to-AC inverter to said starter;
   said one switching element being controlled by said controller so as to be turned off in response to a condition where said lamp fails to start within a predetermined period, thereby interrupting said supply path.

2. The ballast as set forth in claim 1, wherein said controller monitors a load condition of said discharge lamp and provides a disable signal when said no-load signal lasts over said predetermined period, and causing said one switching element to turn off for interrupting said supply paths, in response to said disable signal.

3. The ballast as set forth in claim 2, wherein
   said DC-to-AC inverter having first and second output terminals through which said starter is connected to said DC-to-AC inverter;
   said booster having a third output terminal, said booster being connected through said third and second output terminals to said starter;
   said booster's capacitor having its one end connected to said third output terminal and having the other end connected to said second terminal through said one switching element of said DC-to-AC inverter so as to supply said boosted voltage to said starter;
   said one switching element of said DC-to-AC inverter being responsive to said disable signal to be turned off, thereby interrupting a discharge loop starting from said booster's capacitor through said third output terminal and said second output terminal.

4. The ballast as set forth in claim 3, wherein
   said booster's capacitor has its one end connected to said third terminal and has the other end connected to said first terminal through another switching element of said DC-to-AC inverter, said another switching element being turned off in response to said disable signal.

5. The ballast as set forth in claim 2, wherein said controller includes a timer which provides said disable signal when said discharge lamp fails to start within said starting period.

6. The ballast as set forth in claim 3, wherein said DC-to-AC inverter comprises two pairs of switching transistors arranged in a full-bridge with each pair of the transistors disposed on opposed sides of said full-bridge, one pair of said transistors being controlled to turn on and off alternately with the other pair of said switching transistors to provide said AC power, said full-bridge having inputs connected to receive said DC power from said DC-to-DC converter and having outputs defining said first and second output ends, respectively, one of said transistors defining said switching element connected to said second terminal.

7. The ballast as set forth in claim 3, wherein said DC-to-DC converter, said booster, said DC-to-AC inverter, and said controller are accommodated in a single housing to form a driver module with said first, second and third terminals.

8. The ballast as set forth in claim 1, wherein said DC-to-DC converter includes a transformer with a primary winding and a secondary winding, said booster includes an auxiliary winding magnetically coupled to said primary winding, said primary winding is connected in series with a switching member across said DC power source so that repetitive interruption of said DC voltage source by said switching member induces across said secondary winding a corresponding power which is rectified to provide said DC power to said inverter, and induces across said auxiliary winding of said booster a corresponding power which is rectified to provide said boosted DC voltage.

9. The ballast as set forth in claim 1, wherein said DC-to-DC converter includes a transformer with a primary winding and a secondary winding, said primary winding is connected in series with a switching member across said DC power source so that repetitive interruption of said DC voltage source by said switching member induces across said secondary winding a corresponding power which is rectified to provide said DC power to said booster for generating said boosted DC voltage thereat.

10. The ballast as set forth in claim 6, wherein said booster is connected to receive said DC power from said DC-to-DC converter through one of the switching transistors for providing said boosted DC voltage.

11. The ballast as set forth in claim 3, wherein said DC-to-DC converter includes a transformer with a primary winding and a secondary winding, and includes a converter's capacitor connected across said secondary winding, said booster including an auxiliary winding magnetically coupled to said primary winding, said primary winding is connected in series with a switching member across said DC power source so that repetitive interruption of said DC voltage source by said switching member induces across said secondary winding a corresponding power which is rectified to charge said converter's capacitor for providing said DC power to said inverter, and also induces across said auxiliary winding of said booster a corresponding power which is rectified to charge said booster's capacitor for providing said boosted DC voltage, said booster's capacitor and said converter's capacitor being connected in series between said third and second terminals.

12. The ballast as set forth in claim 11, wherein a connection point between said booster's capacitor and said converter's capacitor is grounded.

13. The ballast as set forth in claim 1, wherein said DC-to-DC converter includes a transformer with a primary winding and a secondary winding, and includes a converter's capacitor connected in series with a diode across said secondary winding, said primary winding being connected in series with a switching member across said DC power source so that repetitive interruption of said DC voltage source by said switching member induces across said secondary winding a corresponding power which is rectified by said diode to charge said converter's capacitor for developing thereacross said DC power, and a connection point between said diode and said converter's capacitor being grounded.

* * * * *